(12) United States Patent
Brodt et al.

(10) Patent No.: US 6,315,353 B1
(45) Date of Patent: Nov. 13, 2001

(54) BODY SEGMENT FOR A VEHICLE

(75) Inventors: Martin Brodt, Renningen; Reinhard Determann, Herrenberg; Karl Wollensak, Eutingen, all of (DE)

(73) Assignee: Daimler-Benz Aktiengesellschaft, Stuttgart (DE)

(*) Notice: Subject to any disclaimer, the term of this patent is extended or adjusted under 35 U.S.C. 154(b) by 0 days.

(21) Appl. No.: 09/201,827

(22) Filed: Dec. 1, 1998

(30) Foreign Application Priority Data

Dec. 1, 1997 (DE) ............................................. 197 53 207

(51) Int. Cl.$^7$ .................................................. B62D 25/20
(52) U.S. Cl. ...................................... 296/203.03; 296/209
(58) Field of Search .................................... 296/188, 209, 296/191, 193, 203.03, 29, 30

(56) References Cited

U.S. PATENT DOCUMENTS

| | | |
|---|---|---|
| 3,176,786 | 4/1965 | Seidl . |
| 4,552,400 | 11/1985 | Harasaki et al. ........................ 296/185 |
| 4,911,495 * | 3/1990 | Haga et al. ............................ 296/209 |
| 5,246,264 * | 9/1993 | Yoshii ................................ 296/203.03 |
| 5,332,281 * | 7/1994 | Janotik et al. .......................... 296/209 |
| 5,362,120 * | 11/1994 | Cornille, Jr. ........................ 296/209 X |
| 5,443,297 * | 8/1995 | Tanaka et al. .................... 296/203.03 |
| 5,641,194 * | 6/1997 | Honma et al. .......................... 296/188 |
| 5,671,968 * | 9/1997 | Masuda et al. .......................... 296/188 |
| 5,820,204 * | 10/1998 | Masuda et al. .......................... 296/188 |
| 5,938,275 * | 8/1999 | Kleinhans et al. ................. 296/209 X |

FOREIGN PATENT DOCUMENTS

| | | |
|---|---|---|
| 195 31 874 C1 | 1/1994 | (DE) . |
| 195 19 779 A1 | 12/1995 | (DE) . |
| 195 05 364 A1 | 8/1996 | (DE) . |
| 40 13 784 C2 | 10/1996 | (DE) . |
| 0 728 656 | 8/1996 | (EP) . |
| 404081371 * | 3/1992 | (JP) ...................................... 296/209 |

* cited by examiner

Primary Examiner—Joseph D. Pape

(57) ABSTRACT

A body segment for a motor vehicle in the area of a side panel has the following characteristics: An open, particularly C-shaped profile part of a constant cross-section which was produced by roll profiling and which extends in the longitudinal direction of the vehicle body; and an interior side member mounted on the profile part in the direction of the interior side of the vehicle body. An interior A-column part and an interior B-column part are mounted on the profile part. Furthermore, the vehicle body segment has a side panel covering which is mounted partially over the profile part in the direction of the exterior side of the vehicle body and which has an exterior A-column part, an exterior B-column part and an exterior C-column part. In this case, the profile part is made of a high-strength steel, and its profile has pronounced displacements toward the exterior side of the vehicle body.

9 Claims, 2 Drawing Sheets

BODY SEGMENT FOR A VEHICLE

The invention relates to a body segment for a vehicle in the area of a side panel.

A vehicle body segment of the above-mentioned type is described in U.S. Patent Document U.S. Pat. No. 5,443,297.

This known vehicle body segment has the disadvantage of not being sufficiently safe in the event of a side impact and of requiring a relatively high-expenditure manufacturing.

A side panel subassembly for a motor vehicle body is known from German Patent Document DE 195 31 874 C1.

However, because of the large components which are assembled here to form a subassembly, an extremely large number of tools and machines must be used which increases the manufacturing costs of the vehicle body. Furthermore, the side impact protection is also not perfect.

From German Patent Document DE 195 05 364 A1, a hollow-profile-type vehicle body segment is known which has at least one member element or panel element with a connection area for a functional part or a functional subassembly. In this connection area, an element of a guide rail device is an integral component of the vehicle body segment which was produced from a cohesive blank by means of rolling forming.

In order to increase the resistance of the vehicle body segment to stress, zones are provided in this case which are subjected to a partial hardening or certain surface treatments. For increasing the stiffness, a double-wall rib may also be provided which is rolled into the interior of the vehicle body segment.

However, the construction described there does not provide a particularly high safety and stiffness in the event of a lateral impact of another vehicle.

German Patent Document DE 40 13 784 C2 describes a vehicle body for passenger cars having a side rail and a side member which are each formed of extruded profiles and are connected by a cast part. This construction has the purpose of increasing the rigidity in the area of the connection between the forward side rail and the side member.

However, in this case, it is a disadvantage that the connection element or nodal element is an extremely complicated cast part whose manufacturing requires very high expenditures. Furthermore, the desired safety in the event of a crash can also not be ensured in this manner.

In addition, German Patent Document DE 195 19 779 A1 describes a frame side part of a vehicle body of passenger cars. In this case, the profile parts forming the frame side part are produced by extruding and the connection elements for the profile parts are produced by casting.

The relatively complicated construction and the low safety in the event of a crash is also a disadvantage in this case.

From U.S. Patent Document U.S. Pat. No. 3,176,786, a motor vehicle frame is known which has side rails and cross members. This frame represents a construction which had been customary for a long time but by far no longer corresponds to today's safety requirements.

It is therefore an object of the invention to provide a vehicle body segment for a vehicle, particularly in the area of a side panel, which, in the event of a lateral impact, is capable of absorbing high forces and thus contributes to an increase of the vehicle safety. The vehicle body segment according to the invention must be producible at reasonable expenditures.

According to the invention, this object is achieved by providing that the profile part is constructed of a high-strength steel with a profile having pronounced displacements to the exterior side of the vehicle body.

By displacing the profile toward the exterior side of the vehicle body, the C-shaped profile part obtains a very high stiffness and can absorb the high forces occurring in the event of a side impact. The high stiffness of the profile part is also promoted by the use of a high-strength steel.

In this case, the production of the profile part by means of roll forming was found to be particularly advantageous because, by means of this process, the required, very pronounced displacement of the profile toward the exterior side of the vehicle body can be carried out. The profile part can absorb the more forces, the more pronounced the displacement toward the exterior side of the vehicle body, or the lower the profile.

In this case, the closing parts according to the invention, which are constructed in the manner of a stop slope, are used for supporting the interior A-column part and the interior B-column part on the profile part, which improves the stability of the whole vehicle body segment.

Advantageous developments and further developments of the invention are found in the subclaims and are illustrated by means of the embodiment shown in the drawing with respect to its basic construction.

FIG. 1 shows the component parts of a vehicle body segment constructed as a side panel 1 which is illustrated in an assembled condition in FIG. 2. The other vehicle body parts, which include the side panel 1, are not shown in the figures because they can be of a known or of an arbitrary construction.

Figure 1:
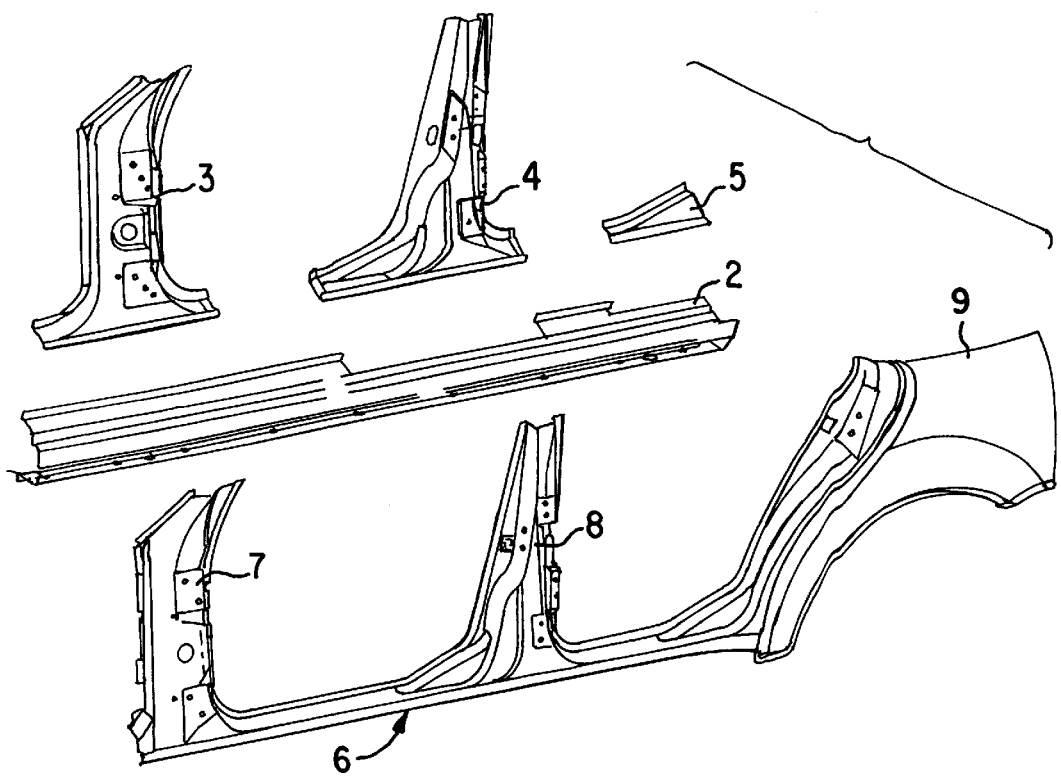
FIG. 1 is an exploded view of the vehicle body segment according to the invention.

In the lower area of the side panel 1, this side panel 1 has an open, essentially C-shaped profile part 2 of a constant cross-section which is arranged in the longitudinal direction. An interior A-column part 3 and an interior B-column part 4 are placed onto the top side of the profile part 2 and are mounted, for example, by point welding, which represents a particularly economical connecting possibility. As an alternative, the interior A-column part 3 and the interior B-column part 4 may also be arranged to be dipping into the profile part 2.

For supporting the interior A-column part 3 and the interior B-column part 4 on the profile part 2, the interior parts 3 and 4 are connected with the profile part 2 by way of additional sloped-shaped closing parts 5 which are constructed as a stop device. This connection can also be implemented by point welding. In this case, the closing parts 5 may also be integrated in the interior A-column part 3 and in the interior B-column part 4. An interior C-column part, which is not shown, is mounted on a vehicle floor which is also not shown.

Figure 2:
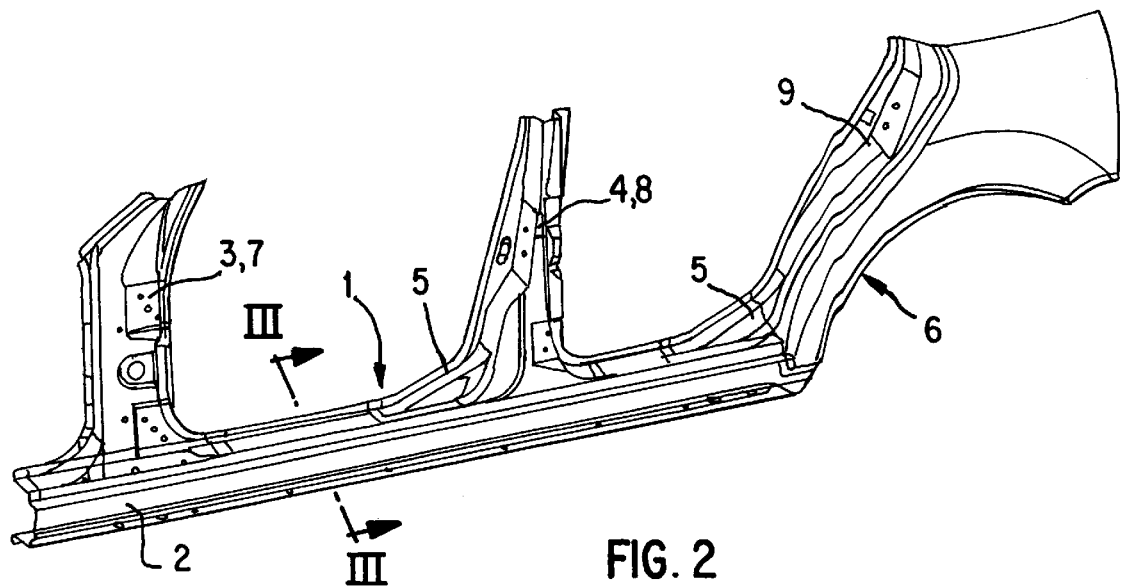
FIG. 2 is an assembly drawing of the vehicle body segment according to the invention.

As illustrated in FIG. 2, by way of the profile part 2, the interior A-column part 3 and the interior B-column part 4, a side panel covering 6 is mounted which forms the exterior shell of the side panel 1. In this case, the side panel covering 6 has an exterior A-column part 7, an exterior B-column part 8 as well as an exterior C-column part 9. As the result of this construction, the side panel 1 can be displaced to a slight degree, whereby occurring manufacturing tolerances can be compensated very well. The side panel covering 6 is made of unalloyed steel, which makes it very suitable for the shell of the vehicle body.

Figure 3:
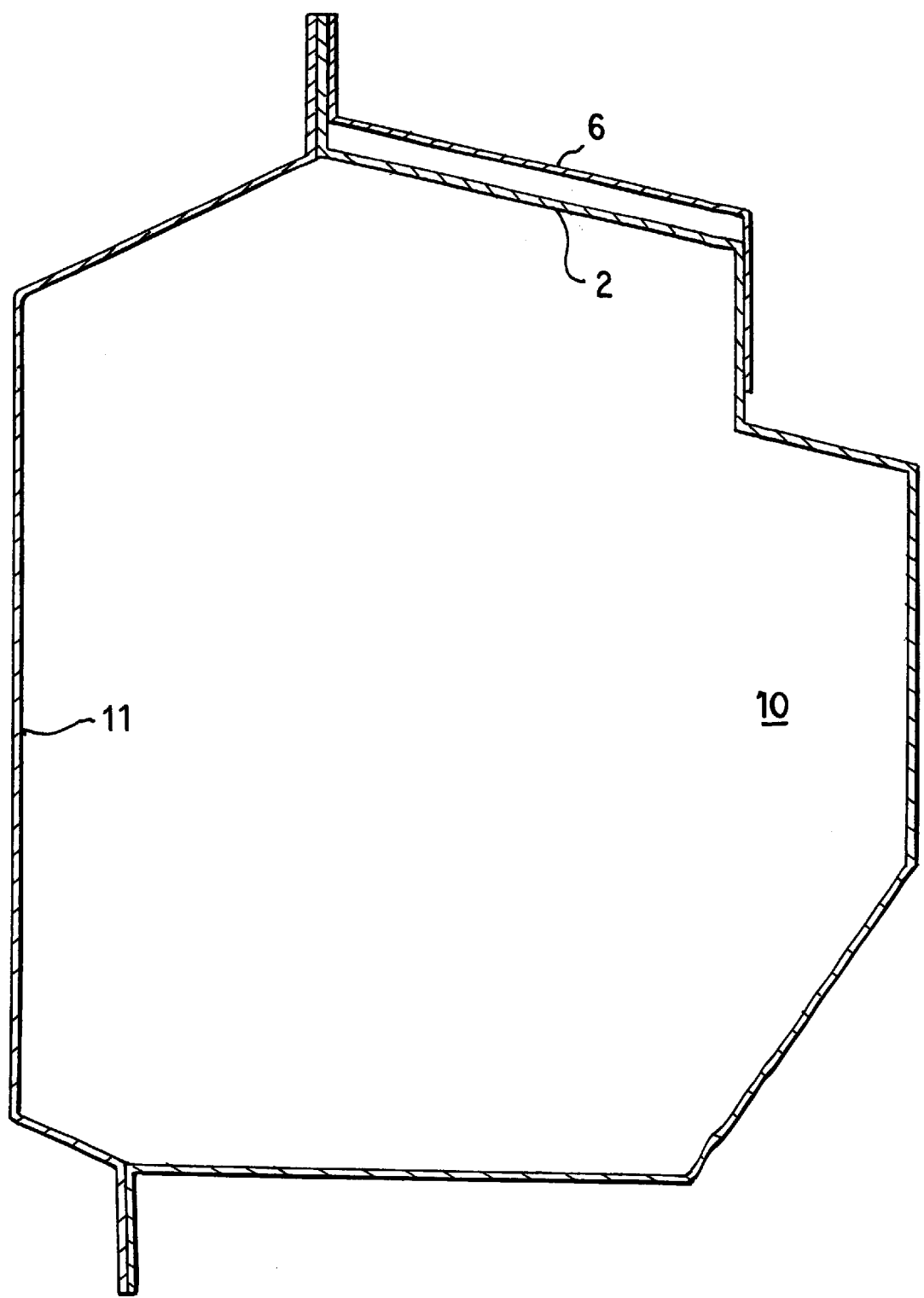
FIG. 3 is a sectional view according to Line III—III of FIG. 2.

FIG. 3 is a sectional view of the lower area of the side panel 1 and thus of the profile part 2. This figure illustrates that the profile of the profile part 2 is very extensively displaced (i.e. pronounced displacement) toward the exterior side of the vehicle. This is permitted in that the profile part 2 is manufactured by means of rolling forming, which allows a very high forming degree in comparison to other forming processes.

In other words, the profile part 2 is provided with a projection 10 on the exterior side of the vehicle body, the depth of the projection 10 being much greater than customary in the case of such components. Furthermore, the profile part 2 has very narrow radii on its edges which are not shown in FIG. 3 because of their small size. By means of the projection 10, in combination with the very small radii, the rigidity of the profile part 2 is increased considerably, whereby the whole side panel 1 offers a very improved protection in the event of a side impact. The absorbable forces are the higher, the farther the profile of the profile part 2 is displaced to the outside or the larger the projection 10.

The stiffness of the profile part 2 is increased even more by the use of high-strength steel. On the other hand, as the result of the high-strength steel, the metal sheets may have a much thinner construction than otherwise customary, and a much lower weight and a better deformability can be obtained for the profile part 2.

For a further increase of the stiffness, the profile part 2 may be provided with shapings which are not shown and which will then extend perpendicularly or horizontally with respect to the longitudinal direction of the profile part 2 and are arranged at the points which are favorable for an increased protection against a lateral impact. For this purpose, additional controlled rollers, which are not shown, can be used during the manufacturing of the profile part.

FIG. 3 also shows that the side panel covering 6 is not pulled downward to the underside of the profile part 2 but only to the upper edge of the projection 10. As a result, an excessive drawing depth is avoided for the side panel covering 6.

However, this also means that the profile part 2, which consists of high-strength steel which is not sufficient for the required quality of the shell of a motor vehicle body, must be provided on its exterior side with an additional side member covering which is not shown. This side member covering may consist of a plastic material and therefore, with respect to the design, can be adapted very well to the respective situations on a vehicle. In addition, the side member covering made of plastic may have a design which is aerodynamically much superior to a case in which a functional part of the side panel or of the floor subassembly is involved.

In this case, the plastic side member covering can be snapped onto the profile part 2 in a simple manner, for purpose of which this profile part 2 is provided with bores, which are not shown, during the rolling or during a later process step.

On the side facing the interior side of the vehicle body, the profile part 2 is connected with an interior side member 11 which simultaneously establishes the connection with a vehicle floor which is not shown. The interior side member 11 is only partially shown in FIG. 3. This connection can be implemented by point welding or by other known connecting methods.

What is claimed is:

1. Body segment constructed as a side panel for a motor vehicle body in the area of a side panel, comprising an open, at least approximately C-shaped profile part which extends in a longitudinal direction of the vehicle body, an interior side member mounted on the profile part in a direction of the interior side of the vehicle body, an interior A-column part and an interior B-column part mounted on the profile part, a side panel covering mounted partially over the profile part in a direction of the exterior side of the vehicle body, the side panel covering having at least one of an exterior A-column part, an exterior B-column part and an exterior C-column part, wherein the profile part is a high-strength steel with a profile having pronounced displacement to the exterior side of the vehicle body, the profile part being produced by roll profiling and having a constant cross-section, and additional closing parts are provided for connecting the interior A-column part and the interior B-column part with the profile part.

2. Vehicle body segment according to claim 1, wherein corners of small radius are provided on the profile part.

3. Vehicle body segment according to claim 1, wherein the side panel covering is unalloyed vehicle body steel.

4. Vehicle body segment according to claim 1, wherein the profile part is provided with shapes which extend perpendicularly or horizontally to a longitudinal axis of the profile part.

5. Vehicle body segment according to claim 4, wherein the shapes are configured by controlled rollers.

6. Vehicle body segment according to claim 1, wherein a lower area of the profile part in the direction of the exterior side of the vehicle body is configured to be covered.

7. Vehicle body segment according to claim 6, wherein the side panel covering is configured to be snapped onto a predetermined portion of the profile part.

8. Vehicle body segment according to claim 1, wherein the interior A-column part and the interior B-column part are point-weld connected with the profile part.

9. Vehicle body segment according to claim 1, wherein the interior side member is point-weld connected with the profile part.

* * * * *